(12) United States Patent
Cao et al.

(10) Patent No.: US 8,883,299 B2
(45) Date of Patent: Nov. 11, 2014

(54) COMPOSITION FOR USE AS NON-STICK COATING

(75) Inventors: David Cao, Guangdong (CN); Thomas J. Bate, Glenview, IL (US)

(73) Assignee: Whitford B.V., Amstelveen (NL)

( * ) Notice: Subject to any disclaimer, the term of this patent is extended or adjusted under 35 U.S.C. 154(b) by 295 days.

(21) Appl. No.: 13/144,986

(22) PCT Filed: Feb. 9, 2009

(86) PCT No.: PCT/CN2009/070381
§ 371 (c)(1),
(2), (4) Date: Aug. 9, 2011

(87) PCT Pub. No.: WO2010/088801
PCT Pub. Date: Aug. 12, 2010

(65) Prior Publication Data
US 2011/0293946 A1    Dec. 1, 2011

(51) Int. Cl.
| | | |
|---|---|---|
| B32B 27/08 | (2006.01) | |
| C09D 127/12 | (2006.01) | |
| B32B 27/00 | (2006.01) | |
| B32B 27/34 | (2006.01) | |

(52) U.S. Cl.
USPC ...... 428/323; 428/421; 428/475.8; 428/476.3

(58) Field of Classification Search
USPC .................. 428/323, 421, 475.8, 476.3
See application file for complete search history.

(56) References Cited

U.S. PATENT DOCUMENTS

| | | | |
|---|---|---|---|
| 5,230,961 A | 7/1993 | Tannenbaum | |
| 5,240,775 A | 8/1993 | Tannenbaum | |
| 6,248,435 B1 | 6/2001 | Leck | |
| 6,596,380 B1 | 7/2003 | Buffard et al. | |
| 6,863,974 B2 | 3/2005 | Shah et al. | |
| 2003/0021988 A1 | 1/2003 | Tannenbaum | |
| 2004/0110011 A1* | 6/2004 | Shah et al. | 428/421 |
| 2007/0134488 A1* | 6/2007 | Hayakawa | 428/323 |

FOREIGN PATENT DOCUMENTS

| | | |
|---|---|---|
| CN | 1064292 A | 9/1992 |
| CN | 1164553 A | 11/1997 |
| CN | 1315984 A | 10/2001 |
| CN | 1343144 A | 4/2002 |
| CN | 1500014 A | 5/2004 |
| CN | 101330986 A | 12/2008 |
| EP | 1197268 A2 | 4/2002 |
| JP | 10323283 A | 12/1998 |
| WO | WO2007/114941 A2 | 10/2007 |

OTHER PUBLICATIONS

The Written Opinion mailed Aug. 9, 2011 from International Searching Authority in related International Application No. PCT/CN2009/070381.

The International Preliminary Report on Patentability mailed Aug. 9, 2011 from International Searching Authority in related International Application No. PCT/CN2009/070381.

* cited by examiner

*Primary Examiner* — Samir Shah

(74) *Attorney, Agent, or Firm* — Faegre Baker Daniels LLP

(57) ABSTRACT

A substrate with a non stick surface which is obtained by sequentially applying on the substrate and curing of at least three coating layers. All coating layers comprise a fluorocarbon resin and some other resins, the basecoat layer and the topcoat layer comprise inorganic particles.

3 Claims, No Drawings

COMPOSITION FOR USE AS NON-STICK COATING

CROSS-REFERENCE TO RELATED APPLICATIONS

This application is a U.S. National Phase Patent Application based on International Application Serial No. PCT/CN2009/070381 filed Feb. 9, 2009, the disclosure of which is hereby explicitly incorporated by reference herein.

BACKGROUND OF THE INVENTION

1. Field of the Invention

The present invention relates to compositions that can be used for non-stick coating applications.

2. Prior Art

Non-stick coatings are well known in the art. In these coatings normally fluorocarbon resins are used, since these resins have a low surface energy as well as thermal and chemical resistance. However, non-stick coatings based upon fluorocarbon resins are limited with regard to abrasion resistance and resistance to flame contact, as well as adhesion to metal substrates. Such coatings are easily damaged when cut with a knife or another metal tool. Rubbing or sanding also easily wears these coatings away.

Non-stick coatings may be applied in a single layer or as a multilayer coating.

One of the problems that is found when using non-stick coatings in frying pans is the absence of browning or searing of the products that are prepared in these pans. This has an impact on the appearance and taste of the products prepared in this way in comparison to products that are prepared in conventional cookware without a non stick coating.

The non-stick coatings according to the present invention combine the well known easy release properties of non-stick coatings with the searing of products.

SUMMARY OF THE INVENTION

According to the present invention such combination of properties can be obtained by sequential applying on a substrate and curing the following coating compositions:
  a) A basecoat composition comprising
    i. 5-15 wt. % of a fluorocarbon resin,
    ii. 5-15 wt. % of an inorganic particle with an average particle size between 5 and 15 µm, and
    iii. 20-30 wt % of a heat resistant binder resin,
  b) A midcoat composition comprising
    i. 50-65 wt. % of a fluorocarbon resin,
    ii. 5-15 wt. % of an acrylic resin, and
    iii. 0-10 wt. % of a heat resistant binder resin, and
  c) A topcoat composition comprising
    i. 50-65 wt. % of a fluorocarbon resin,
    ii. 5-15 wt. % of an acrylic resin, and
    iii. 3-10 wt. % of an inorganic particle with an average particle size between 15 and 20 µm.

Other embodiments of the invention comprise details concerning compositions, relative amounts of ingredients, particle sizes and method steps.

In this description wt. % refers to wt. % based on the total weight of a composition, unless specified otherwise.

DETAILED DESCRIPTION OF THE INVENTION

Basecoat or Primer Composition

In addition to the fluorocarbon resin, the inorganic particles, and heat resistant binder resin, the basecoat composition can comprise one or more of the following components: fillers, pigments surfactants, solvents, defoamers, and any other component for a coating composition known to the person skilled in the art.

In a preferred embodiment the basecoat composition is a waterborne composition, wherein all ingredients are dispersed in water or are water-soluble.

Midcoat Composition

In addition to the fluorocarbon resin, the acrylic resin, and heat resistant binder resin, the midcoat composition can comprise one or more of the following components: fillers, pigments surfactants, solvents, defoamers, and any other component for a coating composition known to the person skilled in the art.

In a preferred embodiment the midcoat composition is a waterborne composition, wherein all ingredients are dispersed in water or are water-soluble.

Topcoat Composition

In addition to the fluorocarbon resin, the acrylic resin, and the inorganic particles, the topcoat composition can comprise one or more of the following components: fillers, pigments surfactants, solvents, defoamers, and any other component for a coating composition known to the person skilled in the art.

In a preferred embodiment the topcoat composition is a waterborne composition, wherein all ingredients are dispersed in water or are water-soluble.

Fluorocarbon Resin

Examples of fluorocarbon resins that can be used in the present invention include polytetrafluoroethylene (PTFE), and copolymers of tetrafluoroethylene (TFE) with hexafluoropropylene (HFP), perfluoropropylvinyl ether (PPVE), perfluoroalkyl vinyl ether, and ethylene. Commercial examples are tetrafluoroethylene-hexafluoropropylene copolymers (FEP), tetrafluoroethylene-perfluoroalkyl vinyl ether copolymers (PFA), ethylene-tetrafluoroethylene copolymers (ETFE). Also mixtures of any of the above polymers, copolymers and monomers can be used.

If the contemplated application or use of the coated item is high temperature, the selection of fluoropolymer(s) should be those that are heat stable.

PTFE is an example of a heat resistant or stable fluorocarbon resins that can be used according to the present invention. Fluorocarbon resins that are melt flowable at a temperature above 300° C. include copolymers of TFE, e.g., FEP and PFA.

The fluorocarbon resins are generally available as a dispersion of the polymer in water. In this dispersion the polymer particles have a small size (usually around 0.2 µm) and a surfactant is used to obtain a stable dispersion. For some polymers it is desirable to include an organic liquid in the dispersion.

The fluorocarbon resin can also be present as a polymer powder, in which case normally an organic liquid is used to mix the particles into the coating composition.

Heat Resistant Binder Resin (Adhesion Promoter)

The heat resistant binder resin that is present in the primer or basecoat composition and that can be present in the midcoat composition is a polymer that is film-forming upon heating (such as by radiation), evaporation of the solvent, and is also thermally stable. The binder shows good adhesion to the substrate and to the fluoropolymer composition that is applied over the primer or midcoat composition. Preferred binders are those that are soluble or solubilized in water or a mixture of water and one or more organic solvents for the binder. This solvent should be miscible with water. The solubility of the binder enhances the mixing of the binder with the other components that are present in the primer composition. An example of a suitable heat resistant binder component is a polyamic acid resin (PAI), which converts to a polyamideimide upon heating. This binder when fully imidized is able to withstand a continuous service temperature in excess of 250° C. In general, the polyamic acid is dissolved in a suitable combination of a solvent, such as N-methylpyrolidone, water, and suitable tertiary alkyl amine. Another example of a suitable heat resistant binder component is polyethersulfone (PES). These polymers can withstand a continuous service temperature in the range from 170° C. to 190° C. Also polyphenylene sulphide (PPS) can be used as a heat resistant binder, either alone or in a mixture with PAI or PES.

Examples of heat resistant binders that can be used according to the present invention include Torlon® Al-10 (ex. Solvay), and Radel A-300 (ex. Solvay).

Acrylic Resin

The midcoat composition and the topcoat composition comprise an acrylic resin. In principle any acrylic resin can be used in these coating compositions.

In a preferred embodiment the acrylic resin has a $T_g$ in the range of 40-70° C. In a further preferred embodiment, the acrylic resin is a water-dispersable acrylic resin.

Inorganic Inert Particles

The basecoat composition and the topcoat composition comprise inorganic particles, which are inert with respect to the other components that are present in the composition and can withstand a continuous service temperature in excess of 250° C. In addition, these particles are also stable at the eventual baking temperature of the non-stick coating. The particles are also not soluble in water or any other solvent that is present in the primer composition. Examples of suitable inorganic particles include inorganic oxides, carbides or nitrides of elements in groups IIA-VB of the periodic table and natural minerals. In the basecoat the inorganic particles have an average particle size in the range from about 5 to about 15 μm, in the topcoat the inorganic particles have an average particle size in the range from about 15 to about 20 μm. The inorganic particles have a preferred Mohs hardness of at least about 5, more preferably a mohs hardness of at least about 6. Examples of inorganic particles with Mohs hardness above 5 include alumina, zirconia, silicon carbide, titanium carbide, aluminium boride, and cristobalite.

In addition to the inorganic inert particles mentioned above, the coating compositions used according to the present invention can also comprise fillers, additives, and pigments that are commonly used in the preparation of coating compositions. Fillers can be any fillers known to those skilled in the art, e.g., barium sulfate, calcium sulfate, calcium carbonate, silicas or silicates (such as talc, feldspar, and china clay). Additives such as stabilizers, antioxidants, leveling agents, antisettling agents, matting agents, rheology modifiers, surface-active agents, UV light absorbers, light stabilizers, amine synergists, waxes, or adhesion promoters can also be added.

Application of the Coating

The substrates coated according to the present invention can be aluminium shaped articles, such as pots, pans, lids, mixing spoons, and all other utensils usually employed for food preparation and cooking (baking pans, oven racks etc.) as well as aluminium sheet to be shaped into the aforesaid articles. In both cases, the aluminium support is simply degreased according to any known method, e.g., in an alkaline or acid environment, or with organic solvents. In this treatment, the aluminium support maintains the surface roughness of the aluminium sheet, i.e. below 1.2 μm. In addition to the degreasing it is possible to roughen the surface, e.g. by sand blasting or grinding, before application of the primer. However, this is not necessary.

In a next step the basecoat composition is applied and the coated article is dried until the coating is touch dry. This drying can be done in an oven. In a further step the midcoat composition and the topcoat composition are applied. In one embodiment, the midcoat is dried before the topcoat is applied. In another embodiment, the midcoat composition and the topcoat composition are applied wet-on-wet.

Finally, the substrate is baked in an oven at a temperature between 380° C. and 440° C., preferably between 410° C. and 430° C.

The invention will be elucidated with reference to the following examples. These are intended to illustrate the invention but are not to be construed as limiting in any manner the scope thereof.

EXAMPLES

The following applies to the examples given below:

Scotch Brite Abrasion Test

The Scotch Brite Abrasion' Test measures a coating's resistance to a constant scrubbing with an abrasive scouring pad. The vertical load on the scouring pad is set to 10 pounds (4.54 kg), and the scouring pad is changed every 10,000 strokes. The number of cycles that are required to scrape the coating down to bare metal is recorded in order to gauge the abrasion resistance of the non-stick system.

Egg Release test

A pan coated with non-stick coating is heated to 150° C., after which an egg is fried. The level of release is rated as follows;

Egg Release Grading Scale (Cleaning with Dishwasher Detergent/Water)

1. Very poor: Egg sticks to wear track and difficult to clean
2. Very poor: Egg sticks to wear track but cleaning somewhat easier
3. Very poor: Egg sticks to 90% of wear track but cleaned fairly easy
4. Very poor: Egg sticks to 80% of wear track but cleaned fairly easy
5. Poor: Egg sticks to 70% of wear track but cleaned fairly easy
6. Fair: Egg sticks to 60% of wear track but cleaned fairly easy
7. Fair: Egg sticks to 20-40% of wear track but cleaned fairly easy
8. Good: Egg sticks to 10% of wear track but cleaned easily
9. Very good: Egg could be removed intact with some difficulty, easy cleaning
10. Excellent: Clean removal of egg intact, no residue left.

Hand Held Tiger Paw Test

The hand held "Tiger Paw" device is an industry-accepted standard, which was designed to test the resistance of a non-stick coating to long-term kitchen abuse. The Hand Held Tiger Paw consists of a weighted apparatus, which uses three "ball point" pens to scratch the coating film. The cookware which is being tested is filled with a thin layer of cooking oil, and heated to 400° Fahrenheit (205° Celsius.)

The Tiger Paw is rotated over the non-stick surface in a circular fashion 2000 times, changing direction every 100 rotations. The coating is then examined for any fraying, blistering, or penetration to bare metal.

1. Comparative Example 1

| | Basecoat | | Middle coat | | Topcoat | |
|---|---|---|---|---|---|---|
| | Raw material | Wt % | Raw material | Wt % | Raw material | Wt % |
| 1 | Deionized water | 61.3 | Black pigment | 0.2 | Hydrocarbon Solvent | 1.4 |
| 2 | N-methylpyrrolidone | 3.4 | Hydrocarbon Solvent | 1.3 | Titania coated mica, EM Ind | 0.3 |
| 3 | Furfuryl Alcohol | 2.4 | Titania coated mica, EM Ind | 0.5 | Cerium octoate | 1.2 |
| 4 | Triton X100 surfactant | 3.0 | Cerium octoate | 1.2 | PTFE emulsion | 62.3 |
| 5 | Aluminum Oxide | 0.8 | PTFE emulsion | 60.1 | FEP emulsion | 2.2 |
| 6 | PTFE emulsion | 16.0 | FEP emulsion | 2.1 | Deionized water | 14.9 |
| 7 | Black pigment | 0.6 | Deionized water | 17.9 | Triethanolamine | 4.3 |
| 8 | Ultramarine blue pigment | 5.0 | Triethanolamine | 4.0 | Oleic Acid | 1.1 |
| 9 | FEP emulsion | 1.0 | Oleic Acid | 1.2 | Acrylic emulsion | 12.0 |
| 10 | Polyamide-imide | 6.5 | Acrylic emulsion | 11.5 | Aluminum Oxide | 0.3 |
| | | 100.0 | | 100.0 | | 100.0 |

1. Comparative Example 2

| | Basecoat | | Middle coat | | Topcoat | |
|---|---|---|---|---|---|---|
| | Raw material | Wt % | Raw material | Wt % | Raw material | Wt % |
| 1 | Deionized water | 52.8 | Black pigment | 0.2 | Hydrocarbon Solvent | 1.4 |
| 2 | N-methylpyrrolidone | 3.4 | Hydrocarbon Solvent | 1.3 | Titania coated mica, EM Ind | 0.3 |
| 3 | Furfuryl Alcohol | 2.4 | Titania coated mica, EM Ind | 0.5 | Cerium octoate | 1.2 |
| 4 | Triton .RTM. X100 surfactant | 3.0 | Cerium octoate | 1.2 | PTFE emulsion | 62.3 |
| 5 | Aluminum Oxide | 0.6 | PTFE emulsion | 60.1 | FEP emulsion | 2.2 |
| 6 | PTFE emulsion | 16.0 | FEP emulsion | 2.1 | Deionized water | 14.9 |
| 7 | Black pigment | 0.3 | Deionized water | 17.9 | Triethanolamine | 4.3 |
| 8 | Ultramarine blue pigment | 5.0 | Triethanolamine | 4.0 | Oleic Acid | 1.1 |
| 9 | FEP emulsion | 1.0 | Oleic Acid | 1.2 | Acrylic emulsion | 12.0 |
| 10 | Polyamide-imide | 6.5 | Acrylic emulsion | 11.5 | Aluminum Oxide | 0.3 |
| 11 | Silicon carbide | 9.0 | | | | |
| | | 100 | | 100.0 | | 100.0 |

2. Example

Sear Coating

| | Basecoat | | Middle coat | | Topcoat | |
|---|---|---|---|---|---|---|
| | Raw material | Wt % | Raw material | Wt % | Raw material | Wt % |
| 1 | Deionized water | 49.52 | Hydrocarbon Solvent | 1.2 | Hydrocarbon Solvent | 0.9 |
| 2 | N-methylpyrrolidone | 2.4 | Titania coated mica, EM Ind | 4.9 | Titania coated mica, EM Ind | 0.8 |
| 3 | Furfuryl Alcohol | 1.2 | Cerium octoate | 0.9 | Cerium octoate | 0.9 |
| 4 | Triton .RTM. X100 surfactant | 0.95 | PTFE emulsion | 55.0 | PTFE emulsion | 53.5 |
| 5 | Aluminum Oxide | 5.0 | FEP emulsion | 3.9 | FEP emulsion | 3.7 |
| 6 | PTFE emulsion | 8.3 | Deionized water | 15.7 | Deionized water | 19.6 |
| 7 | Black pigment | 0.25 | Triethanolamine | 3.5 | Triethanolamine | 3.4 |
| 8 | Ultramarine blue pigment | 4.0 | Oleic Acid | 1.2 | Oleic Acid | 0.9 |

-continued

| Basecoat | | Middle coat | | Topcoat | |
|---|---|---|---|---|---|
| Raw material | Wt % | Raw material | Wt % | Raw material | Wt % |
| 9  FEP emulsion | 0.88 | Acrylic emulsion | 11.5 | Acrylic emulsion | 10.7 |
| 10 Polyamide-imide | 6.5 | Polyethersulfone | 1.2 | Silicon carbide | 5.4 |
| 11 Silicon carbide | 11.0 | | | Black pigment | 0.2 |
| | 100.0 | | 100.0 | | 100.0 |

In these examples, the consecutive coating layers were spayed on a grit blast frying pan at a total film thickness of around 25-32 microns. After a flash bake for 3-5 minutes at 80-120° C., then final cure was done for 3-5 minutes at 427-432° C. Performance comparison of these examples was listed as below.

| | | Comparative example 1 | Comparative example 2 | Example (sear coating) |
|---|---|---|---|---|
| 1 | Egg release | 8 | 9 | 9 |
| 2 | Tiger paw | 500 cycles | 900 cycles | 2,600 cycles |
| 3 | AIHAT | 3 cycles | 7 cycles | 21 cycles |
| 4 | Abrasion | 10,000 cycles | 90,000 cycles | 150,000 cycles |

From the above test result, it is clearly shown that the substrate with the coating in accordance to the present invention shows excellent performance.

The invention claimed is:

1. A substrate with a non stick surface, said non stick surface obtained by sequentially applying on the substrate and curing the following coating compositions:

a) A basecoat composition comprising
   5-15 wt. % of a fluorocarbon resin,
   5-15 wt. % of inorganic particles with an average particle size between 5 and 15 μm,
   a heat resistant binder resin, and balance water,
b) A midcoat composition comprising
   50-65 wt. % of a fluorocarbon resin,
   5-15 wt. % of an acrylic resin, and
   balance water
c) A topcoat composition comprising
   50-65 wt. % of a fluorocarbon resin,
   5-15 wt. % of an acrylic resin, and
   3-10 wt. % of inorganic particles with an average particle size between 15 and 20 μm; and
   balance water.

2. The substrate of claim 1, wherein the basecoat and the topcoat comprise inorganic particles selected from the group consisting of alumina, zirconia, silicon carbide, titanium carbide, aluminum boride, and cristobalite.

3. The substrate of claim 2, wherein the inorganic particles of the topcoat are silicon carbide.

* * * * *